United States Patent [19]
Wasinger

[11] Patent Number: 5,668,843
[45] Date of Patent: Sep. 16, 1997

[54] STORAGE CAGE FOR STORAGE AND TRANSPORT OF FUEL ASSEMBLIES

[75] Inventor: Karl Wasinger, Mühlheim am Main, Germany

[73] Assignee: Siemens Aktiengesellschaft, Munich, Germany

[21] Appl. No.: 685,846

[22] Filed: Jul. 24, 1996

Related U.S. Application Data

[63] Continuation of PCT/DE95/00066, Jan. 18, 1995

[30] Foreign Application Priority Data

Jan. 26, 1994 [DE] Germany ............... 44 02 218.2

[51] Int. Cl.⁶ .................... G21C 19/07; G21F 5/012
[52] U.S. Cl. .................................................. 376/272
[58] Field of Search ................ 376/272; 250/506.1, 250/507.1

[56] References Cited

U.S. PATENT DOCUMENTS

| | | | |
|---|---|---|---|
| 4,096,392 | 6/1978 | Rubinstein et al. | 376/272 |
| 4,348,352 | 9/1982 | Knecht | 376/272 |
| 4,659,535 | 4/1987 | Couture et al. | 376/272 |
| 4,960,560 | 10/1990 | Machado et al. | 376/272 |
| 5,196,161 | 3/1993 | Lewis | 376/272 |

FOREIGN PATENT DOCUMENTS

| | | | |
|---|---|---|---|
| 82317 | 6/1983 | European Pat. Off. . | |
| 158849 | 10/1985 | European Pat. Off. | 376/272 |
| 0 385 186 | 9/1990 | European Pat. Off. . | |
| 0 520 438 | 12/1992 | European Pat. Off. . | |
| 26 29 938 | 1/1978 | Germany . | |
| 29 13 982 | 10/1979 | Germany . | |
| 28 40 594 | 3/1980 | Germany . | |
| 28 36 762 | 8/1980 | Germany . | |
| 29 04 362 | 4/1982 | Germany . | |
| 28 26 962 | 12/1982 | Germany . | |
| 32 12 051 | 3/1984 | Germany . | |
| 34 00 929 | 7/1985 | Germany . | |
| 32 21 810 | 4/1986 | Germany . | |
| 90 00 780 | 5/1990 | Germany . | |
| 41 34 246 | 4/1993 | Germany . | |

*Primary Examiner*—Daniel D. Wasil
*Attorney, Agent, or Firm*—Herbert L. Lerner; Laurence A. Greenberg

[57] ABSTRACT

A storage cage for the storage and transport of a plurality of fuel assemblies includes a baseplate having apertures formed therein. A plurality of casings each have an interior and each stand on the baseplate for receiving and storing a fuel assembly. Each of the casings is associated with at least one of the apertures leading into the interior of the casing for supplying and discharging cooling liquid. Each of the casings has a plurality of slots formed therein for supplying and discharging cooling gas. At least one supporting wall forms a load-bearing part with the baseplate and the casings are fastened to the at least one supporting wall.

11 Claims, 5 Drawing Sheets

STORAGE CAGE FOR STORAGE AND TRANSPORT OF FUEL ASSEMBLIES

CROSS-REFERENCE TO RELATED APPLICATION

This application is a Continuation of International Application Ser. No. PCT/DE95/00066, filed Jan. 18, 1995.

BACKGROUND OF THE INVENTION

FIELD OF THE INVENTION

The invention relates to a storage cage for the storage and transport of a plurality of fuel assemblies, in particular fuel assemblies which have been used in a nuclear reactor for the release of energy by nuclear fission in fissionable material that is contained in the fuel assemblies.

Both the storage and the possibly necessary transport of fuel assemblies, in particular after the fuel assemblies have been used in a nuclear reactor, necessitate an abundance of measures arising from reasons of radiation protection, a need to dissipate heat originating from radioactive decays in the fuel assemblies and a requirement of preventing the formation of an accumulation of fissionable material in which an automatic chain reaction of nuclear fissions could occur.

The first-mentioned reason necessitates a careful shielding of an irradiated fuel assembly, the second-mentioned reason demands special measures for heat dissipation and the third-mentioned reason necessitates that a multiplicity of fuel assemblies always be gathered together in a narrow space only with an appropriate quantity of neutron-absorbing material.

German Patent DE 32 21 810 C2 discloses a device for the storage of irradiated fuel assemblies. The device is to be disposed in a nuclear power station in the vicinity of the nuclear reactor and inside a guard shield surrounding the nuclear reactor. The device includes a storage pond filled with light water and a rack which is disposed in the storage pond and in which the irradiated fuel assemblies can be stored. The rack has a baseplate, on which casings made of boron-containing steel are mounted in a configuration in the manner of a honeycomb. Each casing serves for receiving a fuel assembly. The shielding of the fuel assemblies is guaranteed, in particular, through the use of water. The water also serves, together with the material of the casings, for the absorption of neutrons, in order to reliably rule out the buildup of a chain reaction.

A method and a storage device for the treatment of spent fuel assemblies from nuclear power stations are disclosed in German Published, Non-Prosecuted Patent Application DE 34 00 929 A1. According to that publication, fuel assemblies which are to be removed from a nuclear power station are sealingly enclosed in cans inside the guard shield of the nuclear reactor. Only sealingly closed and, where appropriate, externally decontaminated cans are brought out of the guard shield and stored in an external storage device which is equipped with air cooling for the dissipation of heat energy from the fuel assemblies.

German Published, Non-Prosecuted Patent Application DE 28 40 594 A, like German Patent DE 32 21 810 C, relates to a storage rack for fuel assemblies to be placed in a water pond. The storage rack is composed of rack parts which are disposed next to one another and, where appropriate, also one above the other. A rack part has projections and recesses at the edge of its cross section, which can be fitted together with corresponding recesses or projections in adjacent rack parts and which, in particular, form supporting surfaces between the rack parts. The rack formed from the rack parts, which can be stacked, in particular, in the manner of beer crates, can absorb not only vertically acting, but also horizontally acting forces.

Published European Patent Application 0 385 186 A1 describes a fuel assembly storage rack with an outer frame which has transport lugs at its upper end and which includes a horizontal support plate at its lower end. Vertical tubes having a baseplate are disposed in the outer frame and through the use of which they are fastened to the support plate. Vertical wall surfaces of the tubes run parallel to one another and to the outer frame. In order to ensure the passage of cooling water, the baseplates or the vertical wall surfaces have perforations which are matched with corresponding perforations in the outer frame. The transport lugs serve for lifting the storage rack through the use of a lifting appliance into a fuel assembly storage pond which is provided and for positioning it there.

U.S. Pat. No. 4,960,560 specifies a fuel assembly storage rack with a baseplate and cells being fastened to the baseplate, being extended perpendicularly to the latter and being intended for receiving fuel assemblies. The baseplate contains an aperture for each cell, for the entry of cooling liquid. In order to lift the storage rack, after its assembly, into the intended location in a fuel assembly storage pond, some of the apertures are formed in such a way that an appliance for lifting the storage rack can engage into them. Through the use of the appliance, the storage rack and the fuel assemblies which are disposed therein solely vertically relative to the baseplate, can be lifted into different positions within the fuel assembly storage pond.

The known possibilities for the storage and transport of fuel assemblies always involve the need, where appropriate, to reload fuel assemblies individually from a first storage device into a second storage device, for example from a rack into a transport container. In view of the special requirements to be placed on the handling of such fuel assemblies, that means that handling should always take place only in a specially shielded environment. That also results in a very high outlay which is extremely undesirable, not the least for reasons of radiation protection, since individual fuel assemblies have to be moved for each reloading operation.

SUMMARY OF THE INVENTION

It is accordingly an object of the invention to provide a storage cage for storage and transport of fuel assemblies, which overcomes the hereinafore-mentioned disadvantages of the heretofore-known devices of this general type and which provides a possibility of substantially reducing outlay during transfer of fuel assemblies in comparison with the heretofore-known devices.

With the foregoing and other objects in view there is provided, in accordance with the invention, a storage cage for the storage and transport of a plurality of fuel assemblies, comprising a baseplate having apertures formed therein; a plurality of casings each having an interior and each standing on the baseplate for receiving and storing a fuel assembly; each of the casings being associated with at least one of the apertures leading into the interior of the casing for supplying and discharging cooling liquid; each of the casings having a plurality of slots formed therein for supplying and discharging cooling gas; and at least one supporting wall forming a load-bearing part with the baseplate, the casings being fastened to the at least one supporting wall.

On one hand, the storage cage can be disposed with a plurality of identical storage cages provided with irradiated fuel assemblies, in a water-filled storage pond, in order to store fuel assemblies directly next to a nuclear reactor. In order to ensure that the storage cage can be taken out of the storage pond easily, the baseplate has apertures formed therein, through which a cooling medium, such as water, can flow off out of the casings. Furthermore, the apertures serve for generating a natural circulation of the water along the fuel assemblies for the cooling thereof. Moreover, the storage cage together with the fuel assemblies can be introduced into a transport container and be anchored therein, in order to thereby allow easy transport of the fuel assemblies as a whole. For this purpose in particular, the storage cage has the supporting wall which absorbs all of the loads to be expected, even in the event that the storage cage does not stand on the baseplate for transport, but lies with the baseplate oriented vertically.

Each casing is provided with a plurality of slots to ensure that the gas cooling of the fuel assemblies which is conventionally carried out in a transport container becomes possible. This affords a possibility for the storage, transfer and transport of fuel assemblies which largely avoids the handling of individual fuel assemblies. After the fuel assemblies have been introduced into the storage cage, it is only ever necessary for the storage cage as a whole to be moved.

In accordance with another feature of the invention, the storage cage is constructed, particularly by the provision of a suitable anchor device, in such a way that it can be connected to a plurality of identical storage cages, with all of the baseplates being oriented horizontally, to form a storage rack. An anchor device of this type can, for example, be noses which have bores formed therein and which can be screwed through the use of bolts or the like to adjacent storage cages having corresponding noses. Configurations of catches and hooks, through the use of which mutually adjacent storage cages can be hooked in one another, are also possible.

In accordance with a further feature of the invention, the storage cage can be stacked with another identical storage cage, with the baseplates being oriented horizontally.

In accordance with an added feature of the invention, the storage cage is constructed in such a way that it can be anchored in a sealingly closeable associated container, particularly for transport purposes.

In accordance with an additional feature of the invention, the casings of the storage cage are formed of a neutron-absorbing material, preferably of a boron-containing material, in particular boron-containing steel. Since boron-containing steel is relatively brittle, it usually requires an additional supporting device in order to ensure a sufficient load-bearing capacity of the storage cage. The supporting wall serves this purpose.

In accordance with yet another feature of the invention, the baseplate and the supporting wall are formed of a rust-resistant steel.

In accordance with yet a further feature of the invention, each casing of the storage cage is shrouded by an associated supporting wall. Such a storage cage does not have any exposed surfaces being formed of brittle material, which is particularly advantageous with respect to the load-bearing capacity of the storage cage.

In accordance with a concomitant feature of the invention, the casings of the storage cage form an approximately cylindrical configuration, so that conventionally constructed, that is to say essentially cylindrical containers, can be used for transporting the storage cage.

It goes without saying that the storage cage is provided, according to the requirements of the particular individual instance, with fastening elements for securing suitable lifting appliances. The fastening elements are furthermore advantageously constructed in such a way that they serve as rests and fastening points for a further storage cage which is to be placed onto the first-mentioned storage cage. It is also advantageous if the fastening elements of this type are constructed in such a way that they can serve for fastening the cage in a corresponding transport container. For this purpose, the storage cage is preferably also provided with lateral supports, in order to support the storage cage with negligible play in a container for transport, and where appropriate a horizontal storage of the container and of the fuel assemblies is necessary during transport.

Other features which are considered as characteristic for the invention are set forth in the appended claims.

Although the invention is illustrated and described herein as embodied in a storage cage for storage and transport of fuel assemblies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
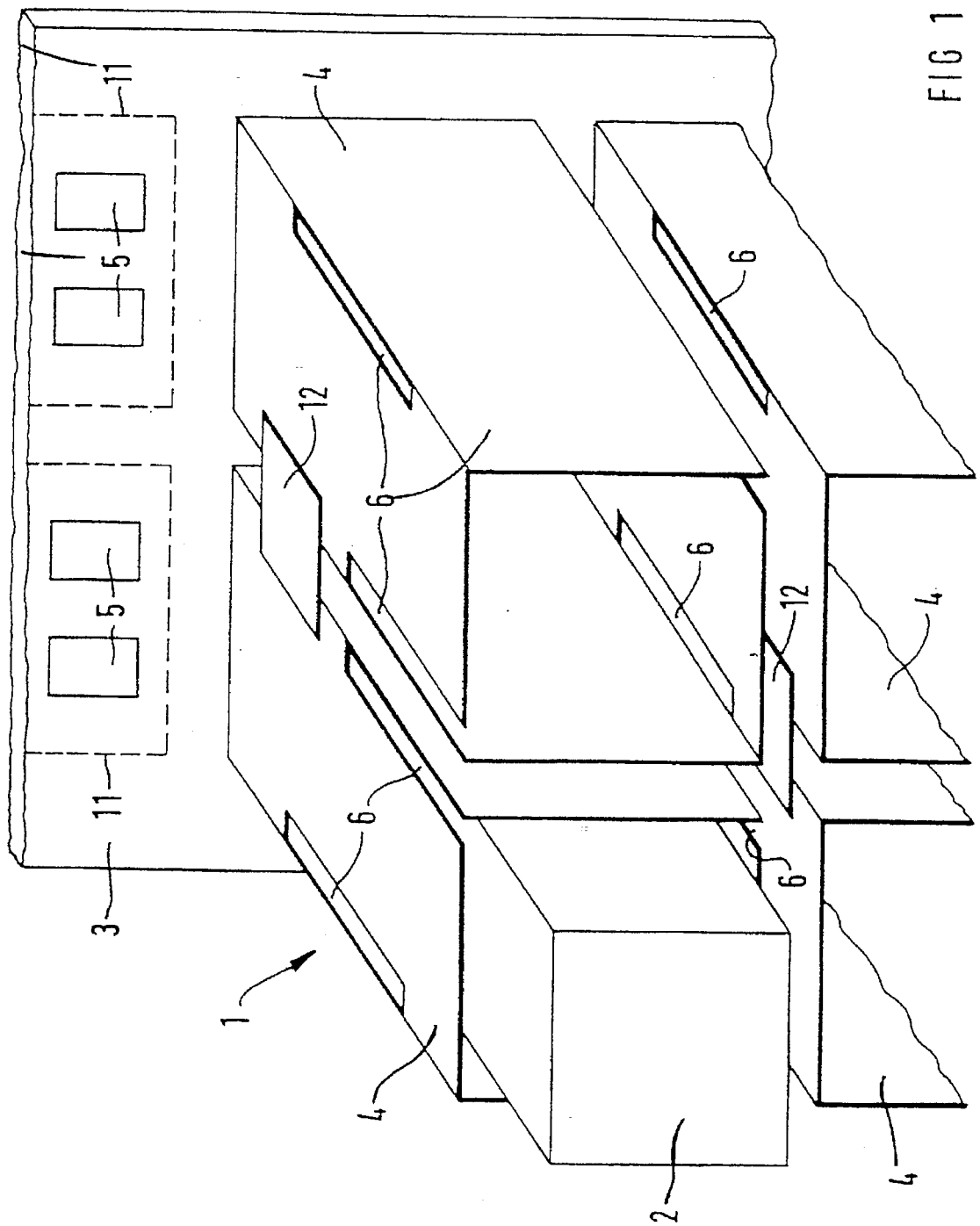
FIG. 1 is a fragmentary, diagrammatic, perspective view of a storage cage.

Referring now in detail to the figures of the drawings, which are partly diagrammatic and/or slightly out of shape in order to emphasize specific features, and first, particularly, to FIG. 1 thereof, there is seen a fragmentary view of a storage cage 1 with a baseplate 3, on which a plurality of rectangular casings 4 stand. A fuel assembly 2 symbolized by a cuboid is located in one of the casings 4. The casings 4 are fastened, especially anchored, on the baseplate 3 by non-illustrated provisions. Further positions 11 for non-illustrated casings are represented by broken lines. The baseplate 3 has apertures 5 which lead into the casings 4 and which make it possible for cooling liquid, especially water, that was previously supplied to be capable of flowing off out of the casings 4 when the storage cage 1 is lifted out of a water-filled storage pond. Each casing 4 has an edge region with lateral slots 6 which allow a cooling gas to circulate in the storage cage 1 between the fuel assembly 2 and the casing 4 when the storage cage is located in a non-illustrated container for transport purposes. The casings 4 are connected to one another through the use of straps 12. A connection between a casing 4 and a strap 12 can be made, in particular, by welding.

Figure 2:
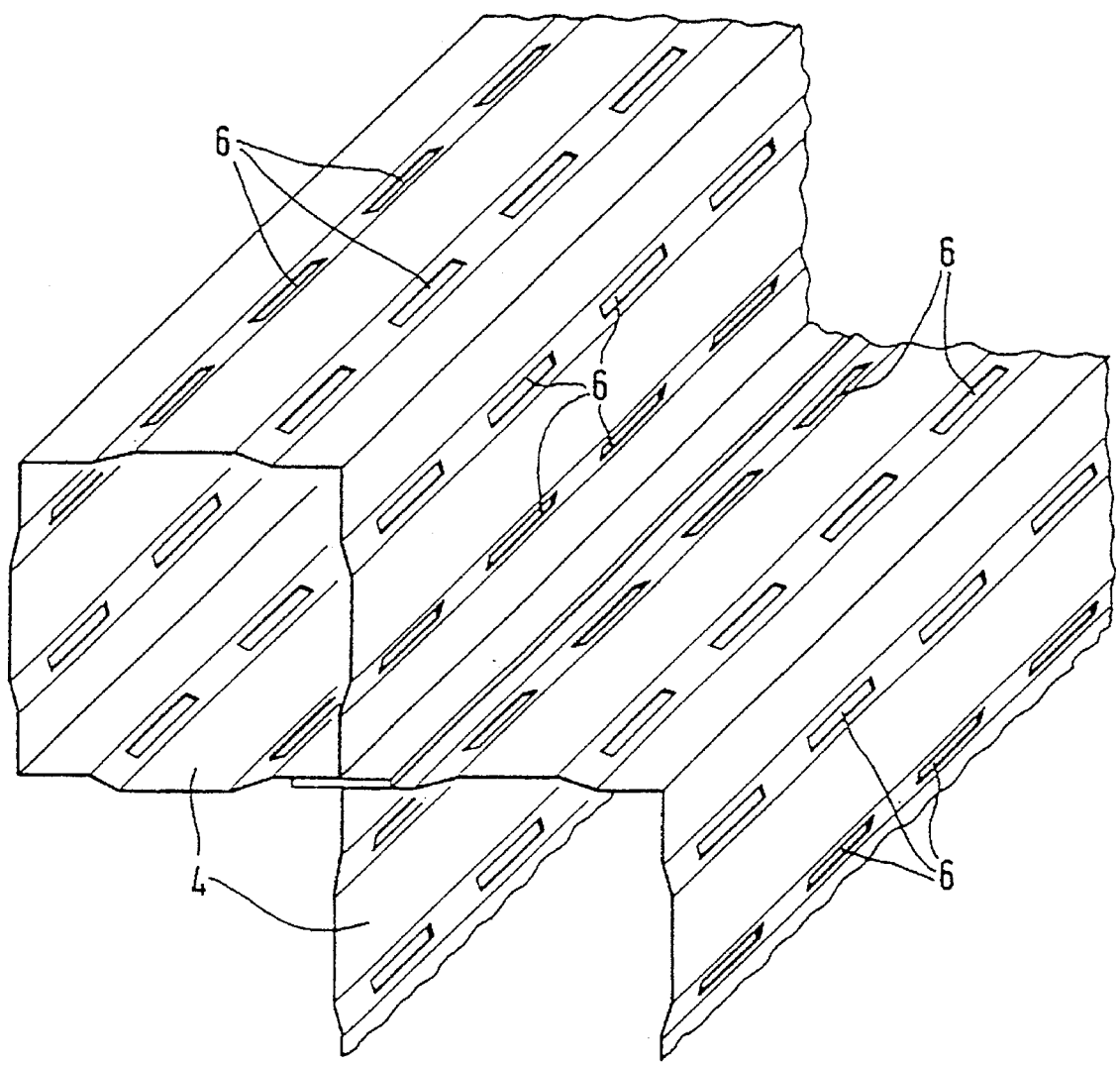
FIG. 2 is a fragmentary, perspective view of two casings from a storage cage.

FIG. 2 shows two casings 4 each of which has a relatively complicated, essentially rectangular cross section and each of which is provided with a multiplicity of slots 6. In this case, the slots 6 are disposed in parallel rows on lateral surfaces of the casings 4 in the longitudinal direction. The shape of the casings 4 and the form, number and configuration of the slots 6 are to be matched to the properties of the fuel assemblies 2 which are to be stored in the casings 4. The form, configuration and number of the slots 6 must be determined in each individual instance, in particular with reference to the thermal heat capacity which emanates from the fuel assembly 2 to be stored in the respective casing 4, and with reference to the cooling which has to be provided accordingly for the relevant fuel assembly 2.

Figure 3:
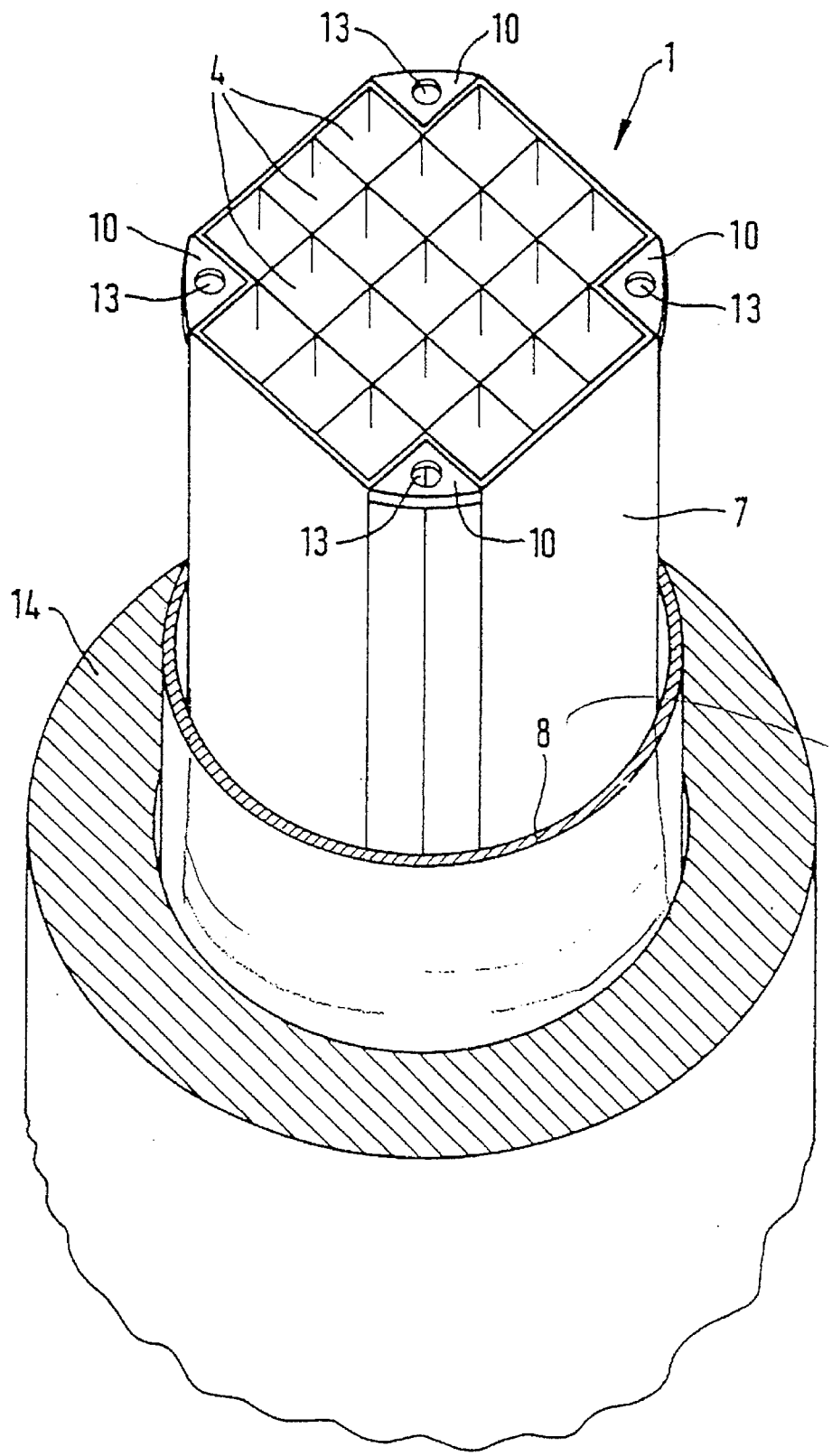
FIG. 3 is a fragmentary, perspective view of a cage during introduction into a container.

FIG. 3 shows a storage cage 1 having a multiplicity of approximately rectangular casings 4 in an approximately cylindrical configuration which is itself shrouded by a supporting wall 7. The supporting wall 7 forms a load-bearing part with the non-illustrated baseplate which, in particular, carries the casings 4 and which is to absorb all of the loads to which the storage cage 1 is exposed. The supporting wall 7 has corners which project into the storage cage 1 and in which anchor plates 10 with bores 13 are mounted at the end. A plurality of storage cages 1 can be connected to one another at the anchor plates 10, and moreover a corresponding lifting appliance can engage on the anchor plates 10. Furthermore, it can be seen from FIG. 3 how the storage cage 1 can be introduced into a container 8. The container 8 belongs to a two-part configuration and is surrounded therein by a shielding jacket 14. The container 8 or an actual transport container receiving the container 8 can be sealingly closed, so that radioactive radiation or radioactive fission products emanating from the non-illustrated fuel assemblies disposed in the storage cage 1 cannot escape into the environment. In this particular case, the shielding jacket 14 forms an integral part of an actual transport container which is equipped for transporting fuel assemblies on public highways.

Figure 4:
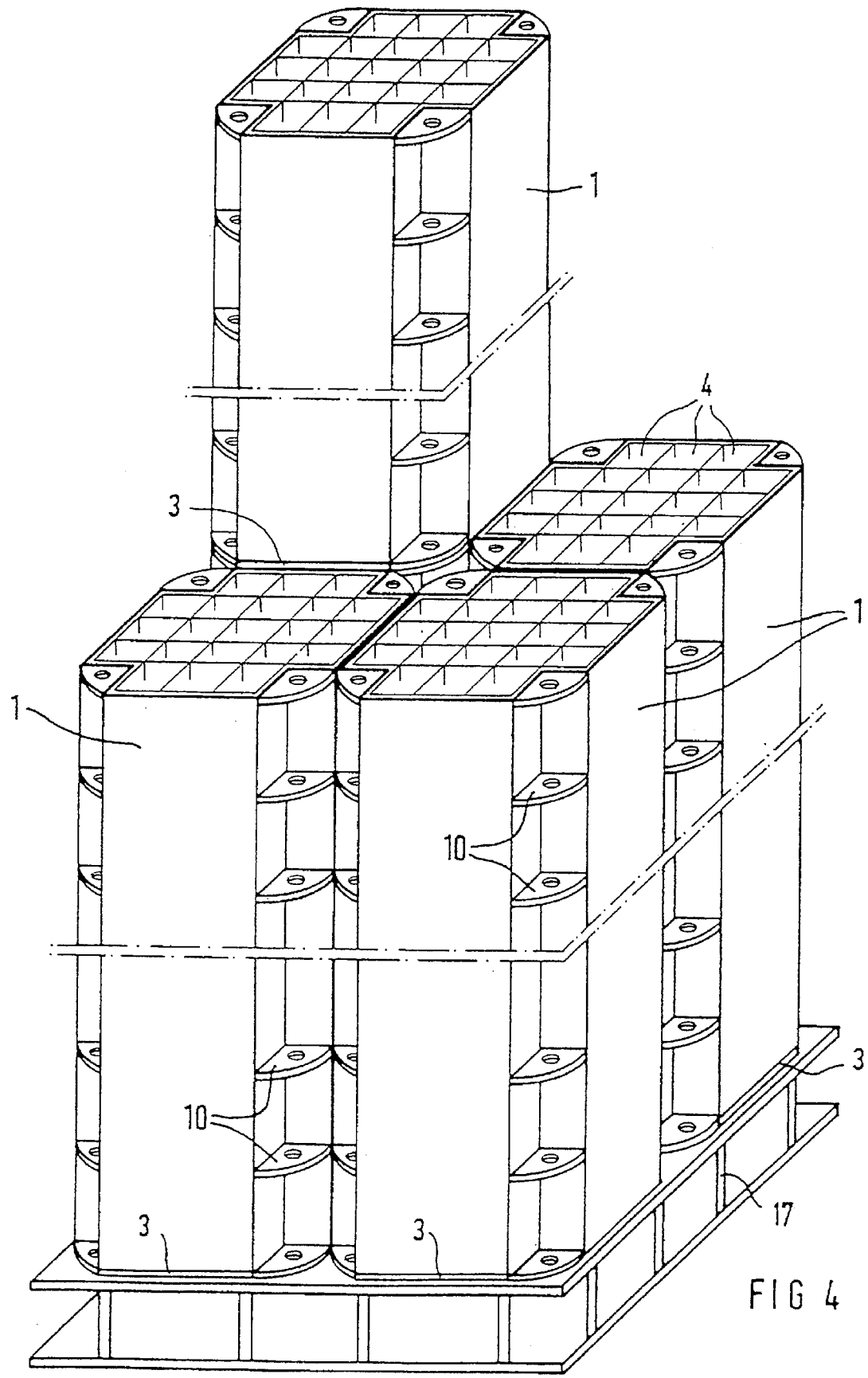
FIG. 4 is a perspective view of a plurality of storage cages which are stacked to form a rack.

FIG. 4 shows how a multiplicity (in this case five) of storage cages 1 can be stacked to form a storage rack for fuel assemblies. The illustrated storage cages 1 essentially correspond in their construction to the construction of the storage cage 1 according to FIG. 3, so that to that extent reference is made to FIG. 3. The storage cages 1 according to FIG. 4 merely each have a multiplicity of anchor plates 10 at each corner disposed one above the other. The storage cages 1 can thus be connected to one another to form a particularly stable rack or can be anchored particularly securely in an associated container. Four of the storage cages 1 are disposed next to one another on a rack plate 17, with the baseplates 3 of the storage cages 1 lying in one plane. The fifth storage cage 1 is placed on one of the four storage cages 1, so that the lowest layer of anchor plates 10 of the storage cage 1 placed on top is congruent with the uppermost layer of anchor plates 10 of the load-bearing storage cage. Anchor plates 10 that touch one another can thereby be fixedly connected to one another.

Figure 5:
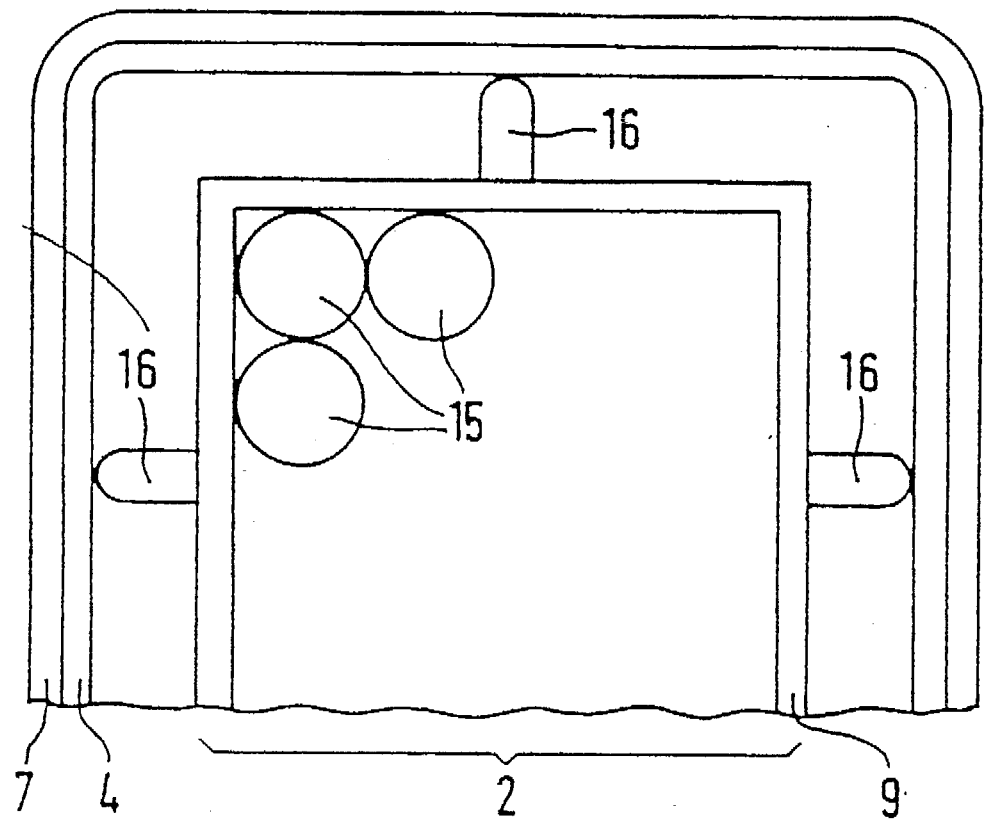
FIG. 5 is a fragmentary, elevational view of a fuel assembly in a casing of the storage cage.

FIG. 5 shows a casing 4 which is especially advantageously incorporated into a storage cage 1 according to the invention. In this case, the casing 4 belongs to a two-layer structure and forms its inner layer. An outer layer of the structure is provided by a supporting wall 7 associated with the casing 4 and connected directly thereto. A storage cage 1 having such casings 4, each of which has its own supporting wall 7, is particularly strong or robust and therefore particularly meets the requirements to be placed on the storage and transport of fuel assemblies 2.

A special construction of a fuel assembly 2 is also illustrated in FIG. 5. The fuel assembly 2 has a frame part 9, in which fuel rods 15, each of which contains fissionable material, are fastened. The frame part 9 has spacers 16 on its outside, in order to position it in a stable manner in the casing 4 (or in the nuclear reactor as well).

The storage cage of any of the structures described above permits the storage and transport of fuel assemblies from a nuclear reactor both under water in a conventional storage pond and under gas, in particular under blanket gas, in a container that is suitable for transport on public highways. The outlay involved in the transfer of the fuel assemblies is reduced substantially in comparison with the structures known heretofore.

I claim:

1. A storage cage for the storage and transport of a plurality of fuel assemblies, comprising:

a baseplate having apertures formed therein;

a plurality of casings each having an interior and each standing on said baseplate for receiving and storing a fuel assembly;

each of said casings being associated with at least one of said apertures leading into said interior of said casing for supplying and discharging cooling liquid;

each of said casings having a plurality of slots formed therein for supplying and discharging cooling gas; and at least one supporting wall forming a load-bearing part with said baseplate, said casings being fastened to said at least one supporting wall.

2. A storage cage assembly, comprising:

a plurality of storage cages each for the storage and transport of a plurality of fuel assemblies, each of said storage cages including:

a baseplate having apertures formed therein;

a plurality of casings each having an interior and each standing on said baseplate for receiving and storing a fuel assembly;

each of said casings being associated with at least one of said apertures leading into said interior of said casing for supplying and discharging cooling liquid;

each of said casings having a plurality of slots formed therein for supplying and discharging cooling gas; and at least one supporting wall forming a load-bearing part with said baseplate, said casings being fastened to said at least one supporting wall.

3. The storage cage assembly according to claim 2, wherein said storage cages are identical, and all of said baseplates are oriented horizontally to form a storage rack.

4. The storage cage assembly according to claim 3, wherein said storage cages are stacked vertically, and said baseplates are oriented horizontally.

5. The storage cage assembly according to claim 3, including a sealingly closeable container for receiving and anchoring one of said storage cages.

6. The storage cage assembly according to claim 2, wherein said casings are formed of a neutron-absorbing material.

7. The storage cage assembly according to claim 6, wherein said neutron-absorbing material is a boron-containing material.

8. The storage cage assembly according to claim 7, wherein said boron-containing material is boron-containing steel.

9. The storage cage assembly according to claim 2, wherein said baseplates and said supporting walls are formed of a rust-resistant steel.

10. The storage cage assembly according to claim 2, wherein said at least one supporting wall is a plurality of supporting walls, and each of said casings is shrouded by a respective one of said supporting walls.

11. The storage cage assembly according to claim 2, wherein said casings form an approximately cylindrical configuration.

* * * * *